(12) United States Patent
Zeng et al.

(10) Patent No.: US 7,649,622 B1
(45) Date of Patent: Jan. 19, 2010

(54) MULTI-SITE OPTICAL POWER CALIBRATION SYSTEM AND METHOD

(75) Inventors: Ke-Cai Zeng, Fremont, CA (US); Steven Cummins, Santa Clara, CA (US); Edward Huber, Portola Valley, CA (US); Vincent Uy, Fremont, CA (US); Steven Sanders, Belomont, CA (US); Patrick Zicolello, Santa Clara, CA (US); Brett A. Spurlock, Los Altos, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 370 days.

(21) Appl. No.: 11/824,216

(22) Filed: Jun. 30, 2007

(51) Int. Cl.
  *G01J 1/10* (2006.01)
  *G01J 1/12* (2006.01)
(52) U.S. Cl. ...................... 356/229; 356/230
(58) Field of Classification Search ... 356/243.1–243.8, 356/213–236
  See application file for complete search history.

(56) References Cited

U.S. PATENT DOCUMENTS

| | | | |
|---|---|---|---|
| 6,512,617 B1 | 1/2003 | Tanji et al. | |
| 6,816,523 B1 | 11/2004 | Glenn et al. | |
| 6,934,033 B2 | 8/2005 | McDaniel et al. | |
| 2006/0226848 A1 * | 10/2006 | Lai et al. | 324/501 |
| 2006/0227085 A1 * | 10/2006 | Boldt et al. | 345/83 |
| 2007/0089012 A1 * | 4/2007 | Chen et al. | 714/742 |
| 2008/0112607 A1 * | 5/2008 | Wu et al. | 382/147 |
| 2008/0238340 A1 * | 10/2008 | Leung et al. | 315/297 |

\* cited by examiner

*Primary Examiner*—Michael P Stafira

(57) ABSTRACT

A test system and method are provided for testing in parallel radiant output of multiple light emitting devices. Generally, the method involves: (i) providing a system having a master, calibrated power meter (CPM), a source transfer standard (STS), and multiple secondary, test site power meters (TSPMs); (ii) determining a relationship between electrical power supplied to the STS and a radiant output therefrom as measured by the CPM; (iii) calibrating the TSPMs using the STS and the relationship between the power supplied to the STS and the radiant output therefrom as determined by the CPM; and (iv) positioning the devices undergoing test on a fixture of the test system and positioning the fixture relative to the TSPMs to test radiant outputs of the devices. Preferably, the TSPMs are calibrated by exposing each to the STS at a known power, determining a difference between the radiant output measured by the CPM and TSPM, using this difference as an offset that is added to the a signal from the TSPM to provide a corrected radiant output for the device under test. Other embodiments are also disclosed.

20 Claims, 5 Drawing Sheets

MULTI-SITE OPTICAL POWER CALIBRATION SYSTEM AND METHOD

TECHNICAL FIELD

The present invention relates generally to light emitting devices, and more particularly to a method and apparatus for calibrating the radiant output of a light emitting device.

BACKGROUND OF THE INVENTION

Light emitting devices and in particular semiconductor light emitting devices, such as light emitting diodes (LEDs) and vertical cavity surface emitting lasers (VCSELs), are widely used in optical communication systems and optical navigation or positioning systems, such as an optical computer mouse. Typically, these systems require the light emitting device to provide a stable, predetermined radiant output when a constant drive current or power is supplied thereto. In particular, a laser, such as a VCSEL, will only laze when the drive current is above a specified threshold, and the optical power or radiant output emitted by the laser will generally rise in predictable if not linear manner with an increase in the applied drive current. However, the radiant output of a semiconductor light emitting device can vary significantly between devices fabricated in different batches, between devices fabricated within the same batch and even between devices fabricated in or on the same substrate. Thus, following fabrication each of the devices are typically independently tested to establish the relationship between drive current or power and radiant output, and a drive circuit for the device adjusted or calibrated to provide the desired, predetermined radiant output.

Conventional methods of testing and calibrating the radiant output of semiconductor light emitting devices all suffer from one or more drawbacks or disadvantages. Referring to FIG. 1, the conventional method of parallel testing of multiple devices, such as a number n of VCSELs 12, requires a corresponding number, 1 through n, multiple reference calibration sensors 14, each precisely positioned in a platform or carriage 16 of a test system (not shown) relative to the devices under test. One shortcoming of this approach is that the reference calibration sensors 14 typically must be calibrated by an independent, outside facility to industry specified standards, i.e., NIST standards, and the test system must be disassembled and all the sensors sent out for re-calibration on a regular basis per the NIST standards. To avoid complete shutdown of the test system when the reference calibration sensors are removed for calibration at least one other complete set of calibrated optical reference sensors is required to continue the production tests. Moreover, even when another set of calibrated optical reference sensors is available, there is inevitably some delay in testing due to the need to disassemble, reassemble and verify correct alignment and operation of the sensors in the test system. Finally, like the light emitting devices themselves there is inherently and inevitably some variation in the sensitivity between the multiple calibrated optical reference sensors, which must be taken into account when determining a range of acceptable radiant outputs from the light emitting devices undergoing test. Thus, the conventional approach is not an easy, efficient nor economic method for quickly and accurately testing substantial numbers of light emitting devices.

In addition to the problems outlined above, the conventional approach is not scalable to allow parallel testing of increased numbers of light emitting devices, nor can the calibrated optical reference sensors be readily adapted for testing devices having different physical dimensions, operating at different frequencies and/or at different radiant output levels.

Accordingly, there is a need for a new test structure or system and method for quickly and accurately testing multiple light emitting devices, such as VCSELs, in parallel in an efficient and economic manner. It is further desirable that the test system and methods are scalable, and suitable for testing devices having different physical dimensions, operating frequencies and/or radiant output levels.

The present invention provides a solution to these and other problems, and offers further advantages over conventional testing structures and methods.

BRIEF DESCRIPTION OF THE DRAWINGS

These and various other features and advantages of the present invention will be apparent upon reading of the following detailed description in conjunction with the accompanying drawings and the appended claims provided below, where:

DETAILED DESCRIPTION

The present invention is directed to a structure or test system and a method of using the same for testing numerous optically active devices fabricated in high densities on a single wafer or semiconductor substrate.

The method of the present invention is particularly useful for manufacturing and testing light emitting devices, such as vertical cavity surface emitting lasers (VCSELs) or devices including a VCSEL.

In the following description, for purposes of explanation, numerous specific details are set forth in order to provide a thorough understanding of the present invention. It will be evident, however, to one skilled in the art that the present invention may be practiced without these specific details. In other instances, well-known structures, and techniques are not shown in detail or are shown in block diagram form in order to avoid unnecessarily obscuring an understanding of this description.

An automated back-end test system and method for testing a radiant output power of multiple light emitting devices in parallel will now be described with reference to FIGS. 2 through 4.

Figure 1:
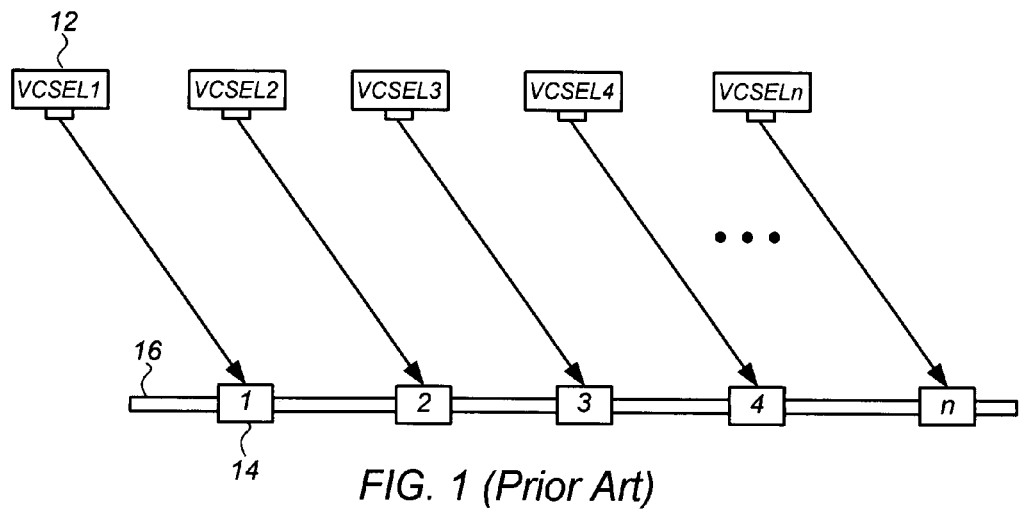
FIG. 1 (Prior Art) is a schematic block diagram illustrating a conventional approach for testing multiple light emitting devices in parallel using multiple, independent calibrated reference sensors.
Figure 2:
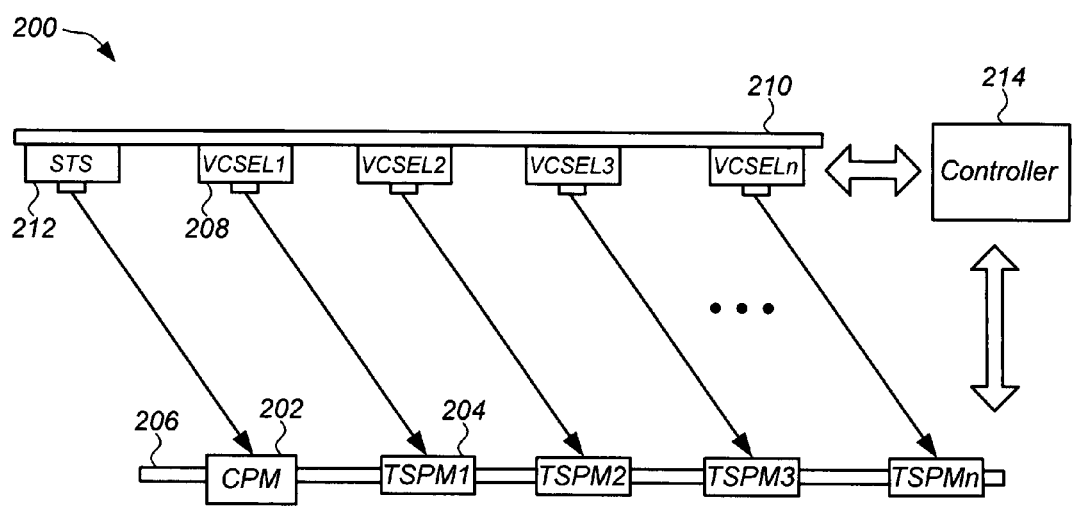
FIG. 2 is a schematic block diagram of a test system for testing multiple light emitting devices in parallel according to an embodiment of the present invention.
Figure 3:
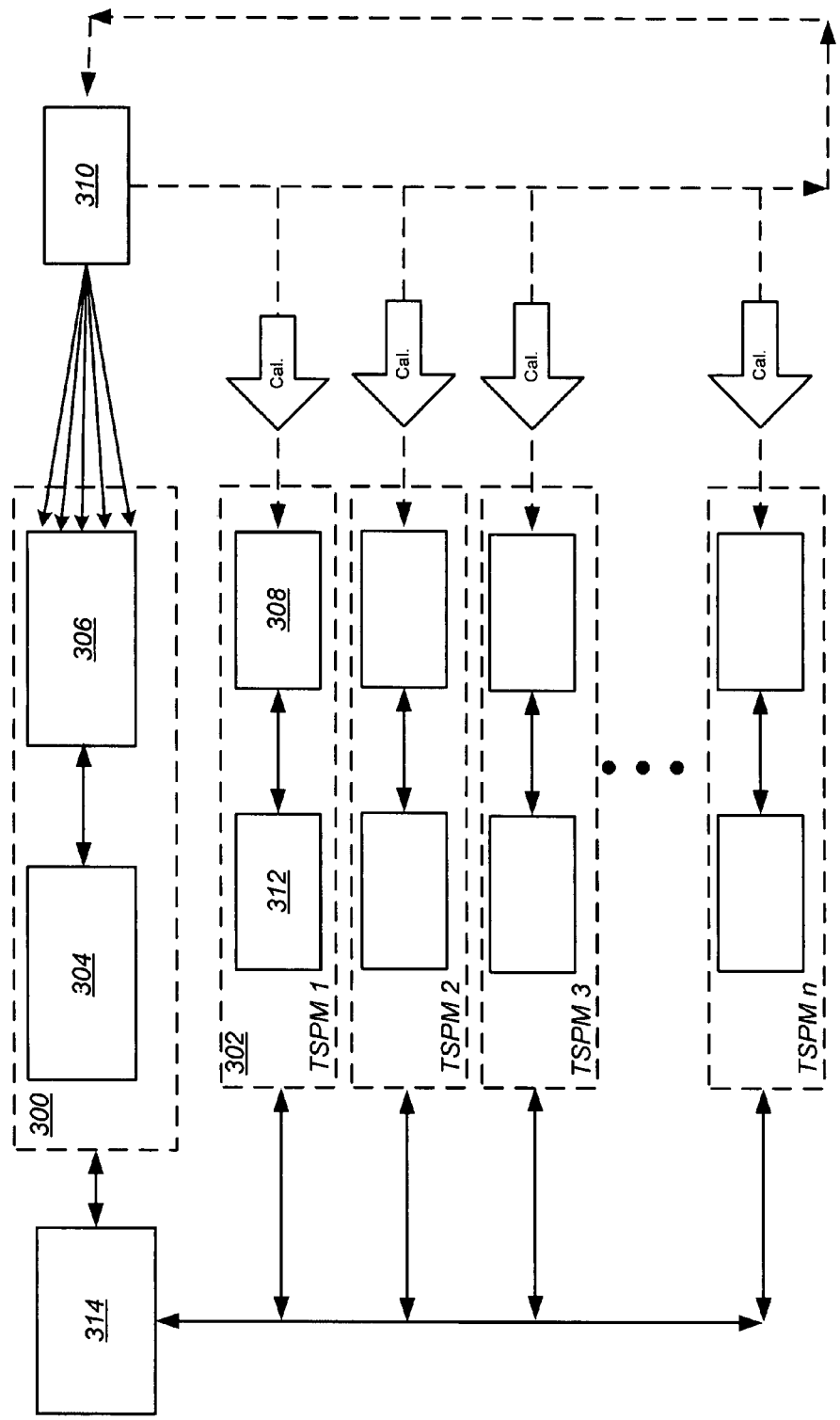
FIG. 3 is a schematic block diagram illustrating a method for calibrating multiple secondary, test site power meters relative to a single master, calibrated power meter according to an embodiment of the present invention.

Referring to FIG. 2, the test system 200 generally includes a master, calibrated power meter (CPM) 202 along with multiple secondary, test site power meters (TSPM) 204 mounted on a platform or carriage 206 of the test system, which may be moved or repositioned relative to a number of number of device under test, such as VCSELs 208, held in predetermined locations on a test fixture 210. The TSPMs 204 are calibrated relative to the CPM 202 using a calibrated light source or source transfer standard (STS) 212 to establish a relationship between the measured optical power versus set electrical power supplied to the STS, first for the CPM and then for each of the TSPMs 204. A difference between the optical powers measured by or interpolated from the CPM 202 and each of the TSPMs 204 for a given STS 212 power level is used to determine an offset or correction factor for each TSPM. Following calibration the multiple secondary TSPMs 202 are used to test or measure in parallel optical power from each of a corresponding number of VCSELs 208. Information obtained from this testing, i.e., measured optical power versus set electrical power supplied to the VCSELs 208, can be adjust drive power or current supplied to each of the VCSELs until the radiant output or optical power it provides reaches a target set point or is in within a specified range of values.

Optionally or preferably the test system 200 is an automated test system further including a microprocessor or controller 214, such as a computer, which stores the offset or correction factor for each TSPM 204 determined in the calibration step and adds this to the optical power measured by the associated TSPM to provide a corrected or true reading for the optical output from each VCSEL 208 or device undergoing test. Alternatively, the controller 214 also receives electrical signals from the CPM 202 and TSPMs 204 indicating the optical power of the light incident thereon and can record the signals from the TSPMs during testing and can adjust the gain of amplifiers (not shown in this figure) couple to the output of the TSPMs during or following the calibration cycle to calibrate the TSPMs.

Preferably, the controller 214 further controls movement of the test fixture 210 and/or carriage 206 to and from a load position where and a test position where the devices undergoing test (DUTs) are aligned with the TSPMs 204 to be tested. More preferably, the controller 214 controls power supplied to the CPM 202, STS 212, TSPMs 204, and the DUTs or VCSELs 208 to begin and end each calibration and test cycle.

In certain embodiments, wherein the DUTs include both light emitting devices, such as VCSELs 208, and integrally electronic adjustable drive circuits or drivers, the controller 214 is further adapted to adjust the drivers to bring the optical output of the DUTs or VCSELs within a specified range.

It will be appreciated by those skilled in the art that the test system 200 of the present invention is significantly less expensive and easier to maintain than prior art systems for testing the radiant output or power of light emitting devices, since it is only necessary to provide and maintain calibrated a single CPM 202. The CPM 202, which generally must be annually or periodically removed from the test system 200 and sent to an outside calibration laboratory to be calibrated in accordance with a National Institute of Science and Technology (NIST) standard, can be quickly and easily exchanged or replaced with another calibrated CPM. Moreover, because the TSPMs 204 are left un-touched it is necessary only to replace and align the CPM 202 within the carriage 206 of the test system 200 and is unnecessary to re-align the TSPMs 200, thereby substantially reducing the downtime in which the system is unavailable.

It will further be appreciated that the test system and method of the present invention is readily scalable by mounting any number of additional TSPMs 204 to the carriage 206 of the test system 200, and can be easily adapted to testing light emitting devices operating at any one of a wide range of different light wavelengths or radiant power levels by replacing the CPM 202 with another CPM calibrated for the desired wavelength and/or radiant power level.

The CPM 300 and TSPMs 302 and a method of calibrating the TSPMs relative to the CPM will now be described in greater detail with reference to a flow diagram shown in FIG. 3. Referring to FIG. 3, the CPM 300 can include a power meter 304 and a calibrated optical head or sensor 306. Generally, the CPM 300 can include any suitable power meter 304 and sensor 306 capable of measuring light or radiant output the desired range of frequencies and power levels. For example, a suitable power meter 304 and sensor 306 can include a Newport 2930-C Meter and a 918-SL sensor, both commercially available from Newport Corporation, of Irvine, Calif.

Each of the TSPMs 302 include an optical sensor or detector 308 that receives light from a source transfer standard (STS) 310 during calibration and a DUT or VCSEL (not shown in this figure) during testing. The detector 308 generates an electrical signal proportional to the radiant power of the light received thereon Preferably, each of the TSPMs 302 further include an amplifier circuit 312 having one or more amplifiers to convert and amplify the signal from the detector 308 which is then coupled to a test system controller 314.

During calibration the radiant output of the STS 310 operated at a known electrical power is detected by each TSPM 302 and is measured or compared by the controller 314 against a previously established relationship between STS power and radiant output as measured by the CPM 300 to determine an offset or correction factor for each TSPM. The offset for each TPSM 302 is stored in the controller 314 and used to correct measurements of the radiant output of the DUTs, thereby calibrating the TPSM.

Alternatively, the amplifier circuit 312 includes one or more operational amplifiers (OPAMPs) having adjustable gain, which can be adjusted to calibrate the output of the TSPM 302 relative to the CPM 300 using the STS 310. Preferably, the gain of the OPAMPS is electronically adjustable by the controller 314 to calibrate each of the TSPMs 302.

The STS 310 is generally a light emitting device capable of operating in any number of a range of frequencies or wavelengths at a range of power levels comparable to those at which the DUTs are to be tested. In one embodiment, the STS 310 is a dedicated light emitting device, such as a VCSEL, of the same type and design as those undergoing test, and which is mounted or fixed in a predetermined location on a test fixture or platen (not shown) of the test system on which the DUTs are placed for testing. The CPM 300 then measures the optical power out from the STS 310 and a relationship between the measured optical power versus a set electrical power supplied to the STS established for the CPM. Next, as illustrated in FIG. 3, the test fixture and/or carriage is repositioned to sequentially expose each of the TSPMs 302 to the STS 310 enabling a relationship between the measured optical power versus set electrical power supplied to be established and then the TPSM calibrated. It will be appreciated that this calibration procedure can be repeated immediately prior to each test cycle or only when or more components of the test system has been serviced or replaced, for example, when the CPM 300 is changed out for off site calibration at a NIST recognized lab. Alternatively, the calibration procedure can be repeated periodically at regular intervals, for example, daily, weekly, monthly or annually, or after a predetermined number of test cycles have been performed.

Preferably, the calibration cycle, like the test cycle, is automated and performed under the control of a controller (not shown in this figure) as described above.

In an alternative embodiment, the STS 310 can be one of the light emitting devices or VCSELs undergoing test that is selected based on its' predetermined location in the test fixture or selected by an operator to server as the STS. For example, the STS 310 can be the VCSEL or DUT that is aligned with the CPM sensor 306 when a test fixture and carriage of the test system are placed in a first test position. The CPM 300 then measures the optical power out from the DUT selected to serve as the STS 310 and a relationship between the measured optical power versus set electrical power supplied to the STS established for the CPM. Next, as illustrated in FIG. 3, the test fixture and/or carriage repositioned to sequentially expose each of the TSPMs 302 to the DUT/STS 310 enabling a relationship between the measured optical power versus set electrical power supplied to be established and the TPSM calibrated. It will be appreciated that one advantage of this embodiment is that the number of DUTs tested in each test cycle can be increased, since at least one position in the test fixture is not set aside for a dedicated STS 310, and in addition the CPM 300 can be used to test a DUT during each test cycle in parallel with those tested by the TSPMs 302.

In another embodiment or aspect of the present invention the detector or sensor heads of the TSPMs include an optical or integrating sphere through which light received from the STS and/or the devices under test must pass prior to striking a surface of the detector or sensor of the TSPM. An integrating sphere is a generally hollow sphere with a diffusely reflecting internal surface, and two or more small openings or ports for introducing light and attaching a detector or sensor. The sphere may further include internal baffles or light barriers to prevent direct illumination of a detector by a light source. The many diffuse reflections of the introduced light caused by the integrating sphere serves to very uniformly illuminate the sensor, substantially desensitizing the test system to misalignment between a tightly focused beam of light, such as that produced by a VCSEL, and the sensor. It will be appreciated by those skilled in the art that that using an integrating sphere significantly reduces the power density of light impinging on the sensor, substantially reducing if not eliminating entirely the potential for damage to the sensor from high power densities, which would likely result in future erroneous measurements. Finally, the use of the integrating sphere reduces the potential for non-linearity induced errors arising from saturation of photosensitive elements in the sensor in a small, localized region by a focused laser beam. By saturation it is meant it is meant a condition in which an increase in light no longer results in an increase in the signal out from the photosensitive elements or sensor.

Figure 4:
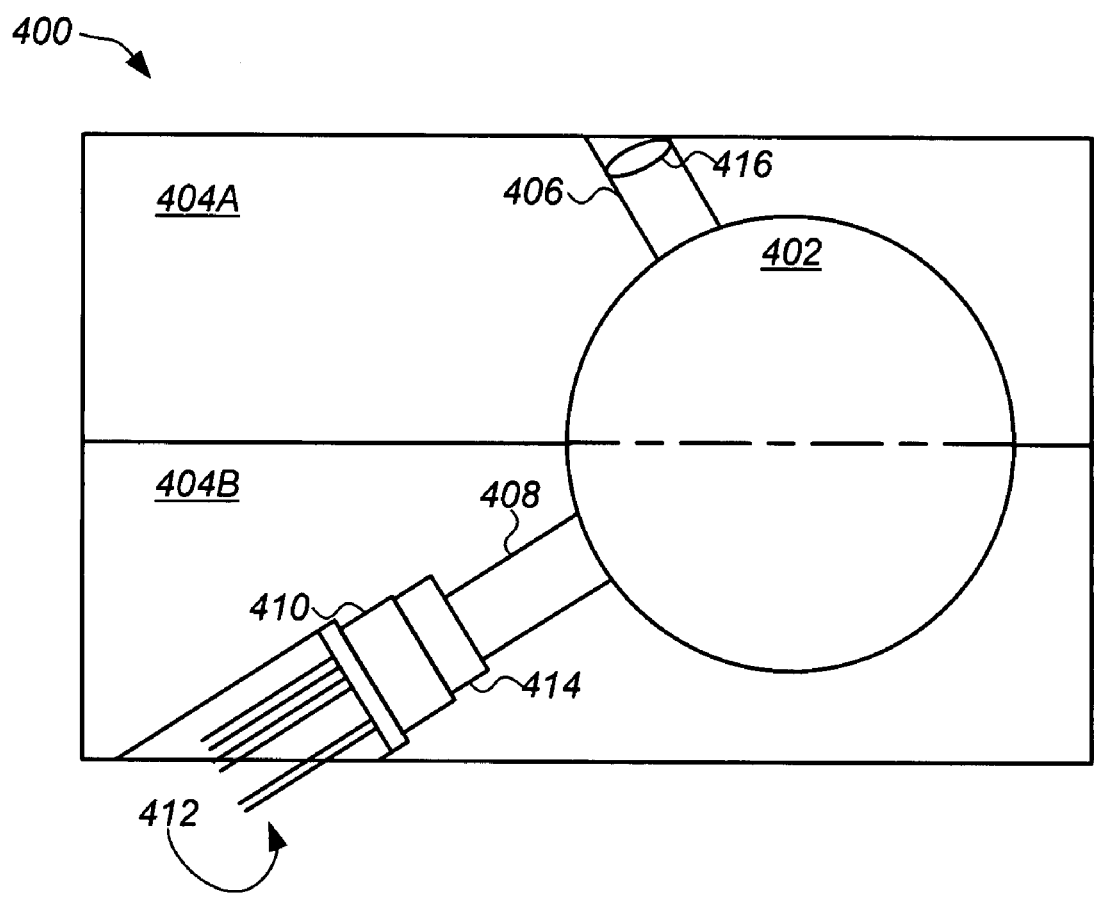
FIG. 4 is a cross-sectional block diagram of a detector head or sensor having an sphere according to an embodiment of the present invention.

A cross-sectional block diagram of a TSPM detector head or sensor having a sphere according to an embodiment of the present invention is shown in FIG. 4. Referring to FIG. 4, the TSPM detector head 400 generally includes any integrating sphere 402 enclosed with a molded, optically opaque block 404A, 404B. Preferably, the block is split into at least two pieces, for example, an upper portion 404A and lower portion 404B to facilitate assembly of the TSPM detector head 400. The block 404A, 404B, includes an optical input 406 and an optical output 408 through which light is transmitted to and from the integrating sphere 402. An optical detector or sensor 410 positioned in or near the optical output 408 receives light from the STS and DUTs entering the optical input 406 and passing through the integrating sphere 402. An electrical signal generated in response to the light received on the sensor 410 is coupled through a number of electrical leads 412 to an amplifier circuit (not shown in this figure) and, preferably, to a test system controller (not shown). More preferably, the optical input 406 is positioned or oriented at an angle relative to an optical output 408, as described above, to provide a more diffuse and uniform light to the optical sensor 410 of the TSPM detector head 400. More preferably, the optical input 406 and optical output 408 form an angle of about 90° as in the embodiment shown to substantially eliminate the possibility of direct illumination or specular reflection from an incoming beam of light damaging the sensor or resulting in a non-linearity induced error as described above.

Generally, the TSPM detector head 400 can include any suitable integrating sphere 402 enclosed within an optically opaque enclosure or block 404A, 404B, and having the desired optical qualities for the wavelengths and power of the devices being tested, and into which a suitable optical sensor 410 may be attached or assembled. Suitable integrating spheres 402 for the TSPM detector head 400 include, for example, a GPS-Cube commercially available from Labsphere Corporation, of North Sutton, N.H. Suitable optical sensor 410 can include, for example, a Photops™ photodiode commercially available from OSI Optoelectronics, of Hawthorne, Calif.

Optionally or preferably, the TSPM detector head 400 can include one or more optical filters 414, such as a narrow band pass filter, generally positioned in the optical output 408 between the integrating sphere 402 and the optical sensor 410 to filter out any light or electromagnetic radiation having a wavelength different from that of the devices under test, thereby improving the accuracy of the calibration and the testing. This light can arise from any number of sources including, for example, environmental light in the space where the test system is located. The optical filter(s) 414 can include any suitable commercially available optical filter having the desired optical properties. For example, where the test system is configured to test VCSELs having wavelengths in the range of from about 870 nanometers (nm) to about 870 μm, the optical filter(s) 414 can include one or more near infrared (IR) interference filters commercially available from CVI Optical Components, of Albuquerque, N. Mex.

Optionally, the TSPM detector head 400 can further include one or more windows or optical elements 416 positioned in the optical input 406 between the DUT and the integrating sphere 402 to substantially prevent any dust, dirt or contamination from entering the enclosure integrating sphere. Additionally or alternatively, the optical elements 416 can include one or more optical filters to substantially prevent any light or electromagnetic radiation having a wavelength different from that of the devices under test from entering the integrating sphere 402.

Similarly to the TSPM detector head described above, the CPM detector or head (not shown in this figure) preferably includes an integrating sphere encased in an optically opaque block and having an optical input and output near which a calibrated optical head or sensor is positioned. However, because in certain embodiments the calibrated optical sensor of the CPM head may be substantially larger than the sensor used in the TSPM detector head 400, the integrating sphere used in the CPM detector or head may also be substantially larger to accommodate the calibrated optical sensor.

Figure 5A:
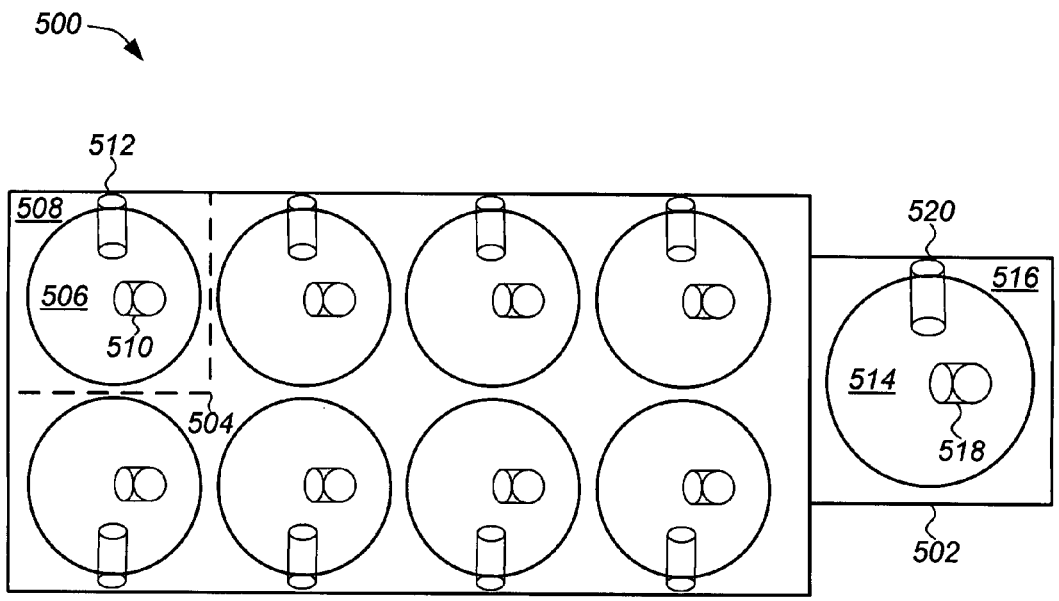
FIGS. 5A and 5B are block diagrams of alternative power meter layouts for a system having a single master, calibrated power meter and multiple test site power meters according to embodiments of the present invention.

A block diagram of a power meter layout 500 for a system having a single master, calibrated power meter or CPM 502 and multiple test site power meters TSPMs 504 according to one embodiment is shown in FIG. 5A. Referring to FIG. 5A, the layout 500 includes eight TSPMs 504 arranged in a single plane of two rows of four TSPMs each. Each TSPM 504 has an integrating sphere 506 encased in an optically opaque block 508 with an optical input 510 and an optical output 512 in or near which an optical detector or sensor (not shown in this figure) is positioned to receive light from the STS and DUTs entering the optical input, passing through the sphere and exiting the optical output. The CPM 502 is located in the same plane as the TSPMs 504 but as shown need not be located or arranged in the same row or column as the TSPMs. The CPM 502 similarly includes an integrating sphere 514 encased in an optically opaque block 516 having an optical input 518 and an optical output 520 in or near which a calibrated optical head or sensor (not shown in this figure) is positioned. In the embodiment shown the integrating sphere 514 and the enclosing block 516 for the CPM 502 is substantially the same size as those of the TSPMs 504. As also shown, the integrating sphere 514 and the enclosing block 516 for the CPM 502 may be substantially larger than those of the TSPMs 504 to accommodate the often larger calibrated optical sensor of the CPM.

Figure 5B:
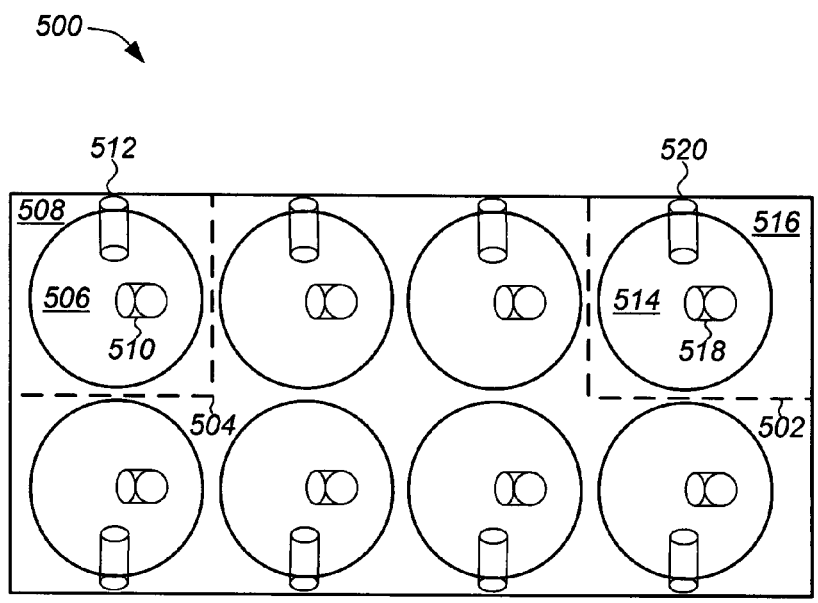

In another more general embodiment shown in FIG. 5B, the integrating sphere 514 and the enclosing block 516 for the CPM 502 can be substantially the same size as the TSPMS 504, and the CPM can be located or arranged in the same row and column as a number of TSPMs.

It will be understood that in either of the above described layouts the CPM 502 can be used not only to calibrate the TSPMs 504 during calibration mode, but to test and measure the output of a DUT during testing mode.

A method for testing multiple light emitting devices in parallel using a number of secondary, test site power meters according to an embodiment of the present invention will now be described with reference to the flowchart of FIG. 6 and the graphs or curves of FIGS. 7A and 7B.

Figure 6:
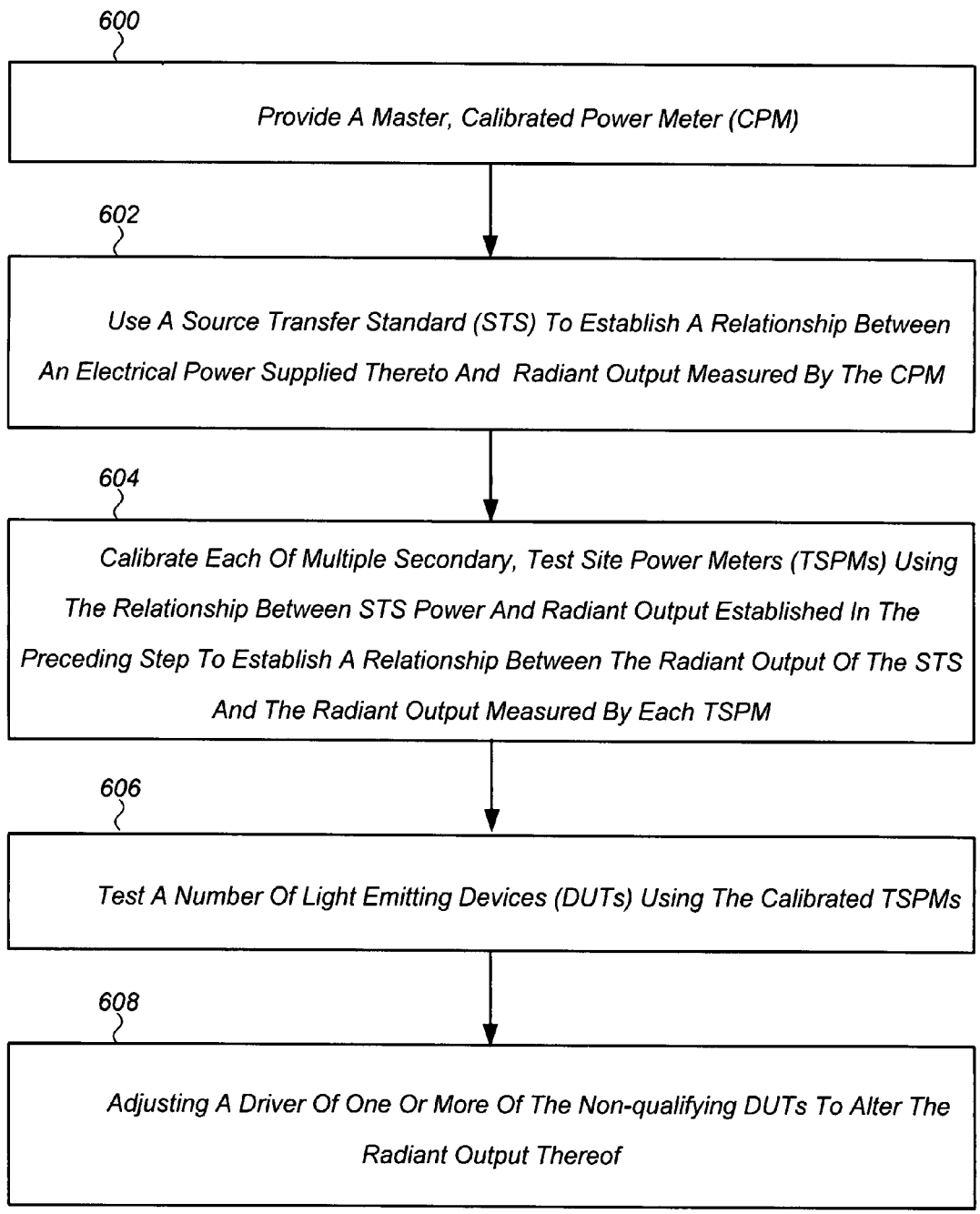
FIG. 6 is a flow chart illustrating a method for testing multiple light emitting devices in parallel using a number of secondary, test site power meters according to an embodiment of the present invention.

Referring to FIG. 6, the method begins with providing a master calibrated power meter (CPM) (step 600). A source transfer standard (STS) is used to establish a relationship between the electrical power supplied to the STS and an optical power or radiant output measured therefrom by the CPM (step 602). Preferably, the radiant output is measured at several different power level of electrical power supplied to the STS to provide or generate a curve from which radiant outputs at different power levels other than those actually measured by the CPM can be reasonably extrapolated. Next, each of the multiple secondary, test site power meters (TSPMs) are calibrated by sequentially exposing each to the STS at several known electrical power levels and using the relationship between STS power and radiant output established in the preceding step to establish a relationship between the radiant output of the STS (or radiant input to the TSPM) and the radiant output measured by each TSPM (step 604). Preferably, this relationship between the radiant power to the TSPM and the radiant output measured by each TSPM is stored as an offset in a test system controller, and used to provide corrected measurements of the radiant output of each DUT tested by the TSPM. More preferably, as described above, the STS is fixed to a test fixture which is moved relative to the CPM and TSPMs by a test system controller that also controls the STS and receives signals from the amplifiers of the TSPMs to automatically sequentially calibrate each of the TSPMs. Finally, a number of light emitting devices undergoing test (DUTs) are place in the test fixture and positioned by the controller relative to the TSPMs to test the radiant output of the DUTs (step 606).

Optionally, where the DUTs include not only the light emitting device but also an electrically adjustable driver therefore, the method can further include the step adjusting the driver alter the radiant output of the DUT to meet a desired specification (step 608), thereby increasing a yield of qualifying DUTs. Preferably, this step of adjusting drivers of the DUTs is accomplished automatically by the test system controller. Alternatively, where the DUT does not include a driver circuit, a similar procedure can be used to determine a necessary adjustment to DUT drivers in the test system, and the test system controller can record or log these adjustments to be later applied to the DUT driver by a technician or another automated system, again increasing the yield of qualifying devices.

It will be appreciated that in those embodiments in which a curve is generated using the CPM to establish a relationship between the level of electrical power supplied to the STS and the radiant output therefrom, it is not necessary that the TSPM is tested at the same STS electrical power as used to establish the relationship between the electrical power supplied to the STS and a radiant output measured by the CPM. In particular, where the CPM has greater accuracy over a particular range of power levels, it may be desirable to generate a curve representing the relationship between electrical power and radiant output using measurements made at those levels, while it may be desirable to calibrate the TSPMs and/or to test the DUTs at somewhat different power levels for which an estimate of the radiant power may be interpolated from the generated curve.

Conversely, in certain embodiments or applications it may be desirable to establish a relationship between electrical and radiant power using the CPM and STS at a few or a single electrical power level, and then calibrate the TSPMs and to test the DUTs only at these same electrical power levels. It will be appreciated that this embodiment, while potentially less accurate, is much more time efficient in the calibration of the TSPMs and the testing of the DUTs.

It will further be appreciated that the calibrations performed at each iteration need not involve calibrating at the same or the same number of power levels. That is, the TSPMs may occasionally or less frequently be calibrated over a wide range electrical powers supplied to the STS, and more frequently re-calibrated or have their calibration verified over one or a smaller number of power levels. For example, the TSPMs may be calibrated over a full range of power levels following replacement of the CPM, and thereafter re-calibrated only quarterly, monthly or weekly over a smaller range of power levels. Furthermore, in between these calibrations and re-calibrations the calibration of the TSPM may only be checked or verified at a single power level and a more robust recalibration performed only if one or more of the TSPMs is found to be in error by a significant amount greater than a predetermined maximum acceptable error.

The advantages of the test system and method of the present invention over previous or conventional systems and methods include: (i) need to maintain only one backup for the master CPM or head; (ii) significant reduction in the cost and time to maintain the test system, as compared to systems having multiple power meters that need regular external calibrations, while achieving substantially the same accuracy while testing an number of devices in parallel; (iii) rapidly and easily scalable by adding additional secondary, TSPMs to the sensor layout on the carriage or test platform; (iv) enables simplified and faster maintenance since it is only necessary to swap the master CPM or head with a backup CPM, and the TSPMs are left un-touched, totally eliminating the need for time consuming re-alignment; (v) quickly and easily adaptable for testing devices operating at different wavelengths or power levels by replacing the CPM one calibrated for the desired wavelength and/or radiant power level, and using the substituted CPM to calibrate the TSPMs; (vi) enables the calibration cycles to be done on a real time basis or any other time interval determined to be desirable; and (vii) the system is more compact due to both reduced size of the TSPMs relative to the CPM.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. In particular, it will be understood that dimensions shown in the accompanying figures, while suitable for fabricating ribbon-type SLMs, are exemplary only, and it is not intended that the invention be limited thereby. It is intended that the scope of the invention encompass the generic area as herein disclosed, and by the claims appended hereto and their equivalents. The scope of the present invention is defined by the claims, which includes known equivalents and unforeseeable equivalents at the time of filing of this application.

What is claimed is:

1. A method for testing in parallel a radiant output of a plurality of light emitting devices, the method comprising:
   a calibration cycle comprising steps of:
      providing a test system having a master calibrated power meter (CPM), a source transfer standard (STS), and a plurality of secondary, test site power meters (TSPMs);
      determining a relationship between electrical power supplied to the STS and a radiant output therefrom as measured by the CPM; and
      calibrating the plurality of TSPMs using the STS and the relationship between the electrical power supplied to the STS and the radiant output therefrom as determined by the CPM; and
   a testing cycle comprising a step of:
      positioning a number of devices undergoing test (DUTs) on a test fixture of the test system and positioning the test fixture relative to the TSPMs to test the radiant output of the DUTs.

2. A method according to claim 1, wherein the step of calibrating the TSPMs comprises the steps of:
   exposing each TSPM to the STS while supplying the STS at a known electrical power level; and
   measuring a signal output from the TSPM generated by the exposure to the STS, and calculating an offset for the TSPM that when added to a radiant output measured by the TSPM produces a corrected radiant output that corresponds to the relationship between the electrical power supplied to the STS and the radiant output therefrom as determined by the CPM.

3. A method according to claim 2, wherein the test system is an automated test system further comprising a controller to automatically execute the steps of the calibration cycle and the test cycle.

4. A method according to claim 3, wherein the DUTs include integrally electronic adjustable drive circuits to drive the light emitting devices, and wherein the method further includes the step of adjusting the drive circuits to bring the radiant output of the DUTs within a specified range.

5. A method according to claim 2, wherein the step of determining a relationship between electrical power supplied to the STS and a radiant output therefrom as measured by the CPM comprises the step of measuring the radiant output with the CPM at a plurality of different electrical power levels to generate a curve expressing the relationship between electrical power supplied to the STS and a radiant output therefrom.

6. A method according to claim 1, wherein the number of DUT can be scaled by increasing the number of TSPMs in the test system.

7. A method according to claim 1, wherein the wavelengths or radiant power levels at which the DUT is tested can be changed by changing the CPM, and executing the executing the calibration cycle.

8. A method according to claim 1, wherein the calibration cycle is executed prior to executing each test cycle.

9. A method according to claim 1, wherein the calibration cycle is executed periodically or after a number of test cycles have been performed, and not prior to executing each test cycle.

10. A test system for testing in parallel a radiant output of a plurality of light emitting devices, the system comprising:
    a source transfer standard (STS);
    a master calibrated power meter (CPM) establishing a relationship between electrical power supplied to the STS and a radiant output therefrom; and
    a plurality of secondary, test site power meters (TSPMs) configured to be calibrated using the STS and the relationship between the electrical power supplied to the STS and the radiant output therefrom as determined by the CPM.

11. A system according to claim 10, wherein each of the TSPMs comprise an amplifier in an output stage of the TSPM, and wherein the TSPMs are further configured to enable a gain of the amplifier to be adjusted so that a signal output from the TSPM generated by the exposure to the STS corresponds to the relationship between the electrical power supplied to the STS and the radiant output therefrom as determined by the CPM, thereby calibrating the TSPM.

12. A system according to claim 10, further comprising a controller configured to receive signals from the CPM and TSPMs and determine a difference between the radiant output from the STS at a given power level as determined by the CPM and that measured by the TSPM to determine an offset for each TSPM, and wherein the controller is further configured to add this offset to a measured radiant output from each of the TSPMs to provide a corrected radiant output for each of the plurality of light emitting devices undergoing test.

13. A system according to claim 12, further comprising a carriage on which the CPM and TSPMs are fixed, and a test fixture on which the STS is fixed, and wherein the controller is configured of repositioning the carriage and test fixture with respect to each other to align the STS first with the CPM and then with each of the TSPMs.

14. A system according to claim 13, wherein the test fixture further includes locations in which devices under test (DUTs) can be held to enable the TSPMs to test the radiant output of the DUTs.

15. A system according to claim 14, wherein the DUTs include integral electronically adjustable drive circuits to drive the light emitting devices, and wherein the controller is further configured to adjust the drive circuits to bring the radiant output of the DUTs within a specified range.

16. A system according to claim 10, wherein the CPM and each of the plurality of TSPMs include an optical head comprising a sensor and an integrating sphere having an optical input for receiving the radiant output of the STS and the light emitting devices, and an optical output for transmitting the radiant output to the sensor, the optical input angularly offset from the optical output.

17. A method for calibrating a system for testing in parallel a radiant output of a plurality of light emitting devices, the method comprising steps of:

provluing a test system including a master calibrated power meter (CPM), a source transfer standard (STS), and a plurality of secondary, test site power meters (TSPMs) to test the radiant output of the plurality of light emitting devices;

determining a relationship between electrical power supplied to the STS and a radiant output therefrom as measured by the CPM; and calibrating the plurality of TSPMs using the STS and the relationship between the electrical power supplied to the STS and the radiant output therefrom as determined by the CPM.

18. A method according to claim 17, wherein the step of calibrating the plurality of TSPMs comprises the steps of:

exposing each TSPM to the STS while supplying the STS at a known electrical power level; and measuring a signal output from the TSPM generated by the exposure to the STS, and adjusting a gain of an amplifier in an output stage of the TSPM so that the signal corresponds to the relationship between the electrical power supplied to the STS and the radiant output therefrom as determined by the CPM.

19. A method according to claim 18, wherein the step of determining a relationship between electrical power supplied to the STS and a radiant output therefrom as measured by the CPM comprises the step of measuring the radiant output with the CPM at a plurality of different electrical power levels to generate a curve expressing the relationship between electrical power supplied to the STS and a radiant output therefrom.

20. A method according to claim 17, wherein the test system is an automated test system further comprising a controller to automatically execute the steps of the method for calibrating the test system.

* * * * *